2,768,968

CARBONYLATION OF OLEFINS WITH COBALT OR NICKEL COMPLEX CATALYSTS

Walter Reppe, Ludwigshafen (Rhine), Nikolaus von Kutepow, Karlsruhe-Rueppurr, and Walter Koelsch, Ludwigshafen (Rhine), Germany, assignors to Badische Anilin- & Soda-Fabrik Aktiengesellschaft, Ludwigshafen (Rhine), Germany No Drawing. Application May 27, 1954,
Serial No. 432,928

Claims priority, application Germany June 13, 1953

13 Claims. (Cl. 260—497)

The present invention relates to the production of carboxylic acids, their anhydrides and esters by the carbonylation of olefinic hydrocarbons in the presence of water and/or low molecular saturated aliphatic alcohols and/or the fatty acids to be produced and more particularly to the manufacture of aliphatic carboxylic acids, their anhydrides and esters by the said carbonylation method in the presence of a specific type of carbonylation catalyst.

It is well known that carboxylic acids or their functional derivatives may be obtained by treating olefins with carbon monoxide and compounds containing a replaceable hydrogen atom, such as water, alcohols, mercaptans, ammonia or primary or secondary amines, or carboxylic acids. This process is generally called carbonylation. More recent investigations of this carbonylation reaction have shown that nickel and cobalt and their compounds are particularly efficient catalysts for the carbonylation of olefins to carboxylic acids and their functional derivatives (see Walter Reppe, Neue Entwicklungen auf dem Gebiet der Chemie des Acetylens und Kohlenoxyds, Springer-Verlag, 1949).

It is an object of our invention to improve the said carbonylation method by providing a novel type of carbonylation catalyst. Other objects of our invention will be seen more clearly from the following description.

We have found, and that constitutes an object of our invention, that complex nickel and cobalt compounds derived from aliphatic carboxylic acids containing in addition to the carboxylic acid group at least one other oxygen-containing, complex-forming substituent, e. g. hydroxy, keto or carboxylic acid groups, have a marked superiority in catalyzing the reaction between olefins, carbon monoxide and compounds with a replaceable hydrogen atom. In particular these complex nickel or cobalt compounds act as if they would be converted in situ into nickel or cobalt carbonyls which are the well known established catalysts for these carbonylations. However, though these compounds act like nickel or cobalt carbonyls they are not definitely converted into these compounds and, therefore, remain active for a long time. Nickel carbonyl or cobalt carbonyl itself, in particular its hydride, are relatively volatile compounds and are removed from the reaction zone by the compounds formed in the carbonylation. In contrast thereto, the catalysts used according to our invention are not converted into volatile nickel or cobalt compounds so that they will be found unchanged after the reaction products and the excess starting materials and eventually the solvents have been removed from the reaction product.

The complex compounds used according to our invention may be nickel and cobalt salts derived from aliphatic hydroxy or keto monocarboxylic acids, such as lactic, 2-hydroxypropionic or propionylpropionic acid. We may also use unsubstituted aliphatic dicarboxylic acids, such as oxalic, malic, succinic, glutaric or adipic acid. We prefer to use aliphatic hydroxy and ketopolycarboxylic acids, such as tartronic, mesoxalic, hydroxysuccinic, tartaric, citric acid, acetone dicarboxylic acid or sugar acid. Generally speaking, the acids used for the preparation of our catalysts should be fully saturated, not contain more than 6 carbon atoms and be free from other substituents except those particularly mentioned above.

When using salts derived from polycarboxylic acids we prefer to replace one of the carboxylic hydrogen atoms thereof by an equivalent of nickel or cobalt, and the remaining hydrogen by another cation, in particular an alkali metal cation, e. g. potassium or sodium, or an ammonium cation which may be substituted. As ammonium ions we prefer to use those derived from ammonia or relatively simple amines, in particular those containing in addition to one or two basic nitrogen atoms exclusively carbon and hydrogen. To cite a few examples of such amines, we refer to mono-, di- and trialkyl amines, containing saturated hydrocarbon radicals with between 1 and 6 carbon atoms, in particular trimethyl and triethyl amine. Diamino alkanes, such as ethylene, propylene and butylene diamine and their N-alkyl derivatives, such as tetramethyl or -ethyl derivatives are also suitable. Pyrrolidine, piperidine and their N-alkyl derivatives, such as N-methyl, propyl or butyl polymethylene imines, pyridine, pyrrole and their homologues, may also be used. The specific amine used is not essential. Generally speaking, they should not be too high molecular, i. e. contain more than 10 carbon atoms.

The catalysts may be prepared by simply heating together in aqueous medium nickel or cobalt carbonate with an acid of the type referred to above. The preferred catalysts may be prepared by heating together in an aqueous medium about 2 molecular proportions of a hydroxy or keto dicarboxylic acid mono alkali metal salt with one molecular proportion of nickel or cobalt carbonate. The solution obtained may be used directly as a catalyst. It is also possible to start from the dicarboxylic acid, an amine and nickel or cobalt carbonate and have them react together in a solvent, e. g. water. This solution may then be used as the catalyst.

It is not necessary to start the carbonylation of the olefins in the presence of the ready-made catalyst. They may very efficiently be allowed to form in situ by just adding the various constituents of the catalyst to the starting mixture. If, for example, preparing propionic acid by the carbonylation of ethylene, we may simply add pyridine or triethyl amine or the like, and the complex forming acid, on the one hand, and nickel or cobalt carbonate, on the other hand, to water and then treat it with ethylene and carbon monoxide.

We prefer to carry out the carbonylation in the liquid phase. We may work batchwise by just pressing carbon monoxide or a mixture of carbon monoxide and the olefin to the water or alcohol or the aqueous alcohol admixed with the catalyst, while heating to reaction temperatures, usually to between 170° and 290° C. The end of the reaction may be easily seen from the fact that the gas is no longer absorbed. We prefer to work under a pressure exceeding 50 atmospheres, preferably between 150 and 800 atmospheres. We may work at higher pressures if the necessary equipment is available.

The reaction may also be carried out continuously, for example by allowing a solution of the catalyst in water, alcohol or the carboxylic acid to be produced to trickle through a column charged with distributing bodies, while leading carbon monoxide or a mixture of this with an olefin in countercurrent to the solution. We may also work continuously by leading the starting materials in direct current through a suitable high pressure vessel. In all cases we may use additional solvents, such as saturated hydrocarbons or the reaction products themselves, in particular the acid to be produced, or other inert solvents, such as carboxylic acid esters, lactones and the like.

The olefinic hydrocarbons used as starting materials may be admixed with saturated hydrocarbons. The reaction is applicable not only to gaseous hydrocarbons, such as ethylene, propylene and butylenes, but also to higher olefinic hydrocarbons, such as octene, octadecene or mixtures of such hydrocarbons as they are obtained by cracking paraffin wax or by the synthesis of hydrocarbons from carbon monoxide and hydrogen. While we prefer to work with an olefin:carbon monoxide ratio of about 1:1, it is also possible to use other ratios, such as 0.5:1 or 1:0.5 or even lower than that.

When carrying out the carbonylation with water, fatty acids will result as the reaction product. Instead of water, we may use alcohols, in particular low molecular saturated aliphatic alcohols, such as methanol, ethanol, n- and iso-propanol or the butanols, esters then being produced. When starting with a carboxylic acid, an anhydride will be formed. We may also use mixtures of water with either alcohols or acids or both.

As already mentioned, the main advantage of the catalysts used according to our invention resides in the possibility of using them repeatedly. The recovery of the catalyst is so simple that, for example in the conversion of ethylene, carbon monoxide and water, propionic acid and/or alcohol to propionic acid, its anhydride or its esters in the presence of complex nickel or cobalt salt, it is only necessary to distil off from the reaction mixture propionic acid, anhydride or ester and to use the distillation residue without further purification for a new batch. Small nickel or cobalt losses may be made up by adding a small amount of fresh nickel or cobalt salt solution.

Another advantage of our catalysts consists in that, other conditions being identical, they have better catalytic activity than the conventional carbonylation catalysts. In order to achieve the same results, less nickel or cobalt is required or the rate of conversion is better.

The following examples will further illustrate how our invention may be carried out in practice. The parts are by weight.

*Example 1*

The catalyst solution is prepared in the following manner:

Nickel carbonate and acid potassium tartrate are dissolved in water in a molecular ratio of 1 to 2. The mixture is heated while stirring to boiling and then allowed to cool.

80 parts of a 2.8 percent potassium nickel tartrate solution obtained in the foregoing manner, having a nickel content of 0.38 percent, and 20 parts of propionic acid are charged into an autoclave lined with copper. The whole is heated to 285° C. and a mixture of ethylene and carbon monoxide (ratio 1:1) is pressed in under 200 atmospheres until it is no longer absorbed. After 24 hours the reaction is finished. There are obtained 378 parts of a reaction mixture which contains 77 percent of propionic acid and 11 per cent of propionic acid anhydride. These two products are distilled off. The catalyst is found almost quantitatively in the distillation residue. It may be used again without further purification.

When under otherwise identical conditions a 1.85 percent aqueous potassium nickel tartrate solution, having a nickel content of 0.25 percent, is used, the reaction product (332 parts) consists of 91 percent of propionic acid and 3 percent of propionic acid anhydride.

80 parts of a 0.92 percent aqueous potassium nickel tartrate solution corresponding to a nickel content of 0.12 percent will yield under otherwise identical conditions 315 parts of a reaction product containing 90 percent of propionic acid.

By increasing the pressure of the ethylene-carbon monoxide mixture to 300 atmospheres, the reaction time is decreased to about 19 hours while the rate of conversion and the composition of the reaction product remain substantially the same.

*Example 2*

80 parts of a 2.22 percent aqueous potassium nickel tartrate solution, having a nickel content of 0.3 percent, which has been prepared in the manner described in Example 1 and 20 parts of propionic acid are subjected to carbon monoxide and ethylene under the conditions of Example 1 with the difference that the reaction temperature is kept between 260° and 270° C. The reaction product (about 365 parts) contains 76 percent of propionic acid and 17 percent of propionic acid anhydride.

The catalyst is found back in the distillation residue and may be used again.

When working under otherwise identical conditions with a 3.1 percent aqueous potassium cobalt tartrate solution, there are obtained 333 parts of a reaction product containing 83 percent of propionic acid and 9 percent of propionic acid anhydride.

*Example 3*

80 parts of a 2.6 percent aqueous pyridinium nickel tartrate solution corresponding to a nickel content of 0.3 percent which has been prepared by dissolving nickel carbonate, pyridine and tartaric acid in a molecular ratio of 1 to 2 to 2 in water and subsequent heating while stirring and 20 parts of propionic acid are treated with carbon monoxide and ethylene in the manner described in Example 1 at 270° C. The reaction product (about 416 parts) contains 84 percent of propionic acid and 7 percent of propionic acid anhydride. The nickel catalyst will be found back quantitatively in the distillation residue and may be used for another process.

The reaction was repeated with a 2.4 percent solution of methyl pyrrolidinium nickel tartrate at 260° C. under 200 atmospheres. The reaction product (386 parts) contains 87 percent of propionic acid.

When using under the same conditions a 2.4 percent solution of dimethyl butyl ammonium nickel tartrate, 395 parts of a reaction mixture, containing 83 percent of propionic acid, were obtained.

*Example 4*

To a mixture of 20 parts of propionic acid and 80 parts of water there are added 1 part of nickel acetate containing 0.27 part of nickel and 4 parts of propionyl propionic acid. The mixture is subjected to the action of ethylene and carbon monoxide (1:1) under the conditions described in Example 1 at a temperature of 260° to 270° C. There are obtained 450 parts of a reaction mixture which has a propionic acid content of 76 per cent and a content of propionic acid anhydride of 7 per cent. Almost 80 per cent of the nickel used as catalyst will be found back in the distillation residue.

The reaction was repeated while substituting the propionyl propionic acid by 3 parts of lactic acid. There are obtained 425 parts of a reaction mixture containing 79 per cent of propionic acid and 5 per cent of propionic acid anhydride. By increasing the pressure to 300 atmospheres, the reaction time is shortened to 20 hours.

*Example 5*

A mixture of 80 parts of water, 20 parts of propionic acid, 0.5 part of nickel acetate, containing 0.14 part of nickel, and 0.4 part of citric acid is treated in the manner described in Example 1 with an ethylene-carbon monoxide mixture (1:1). The reaction product contains 79 per cent of propionic acid. The distillation residue contains 94 per cent of the nickel used as catalyst. The distillation residue may be used for another batch without decrease in the yield of propionic acid.

When using 0.8 part of cobalt propionate instead of nickel acetate, an 83 per cent propionic acid is obtained.

Example 6

160 parts of water, 40 parts of propionic acid, 2 parts of cobalt acetate containing 0.5 per cent of cobalt and 8 parts of propionyl propionic acid are charged into a rotating autoclave lined with silver. Ethylene and carbon monoxide in the ratio of 45 to 55 are pressed on this mixture under 300 atmospheres at 260° C. until this mixture is no longer absorbed. The reaction product (407 parts) contains 65 per cent of propionic acid. After having distilled off this propionic acid and water not used up in the reaction, the distillation residue contains practically all the cobalt used as catalyst. The distillation residue may be used again for catalysing another batch of the starting materials.

Example 7

A mixture of 160 parts of n-propanol, 40 parts of propionic acid, 20 parts of water, 2 parts of cobalt acetate, 4 parts of pyridine and 4 parts of tartaric acid is treated in a silver-lined autoclave while stirring at 295° C. and under 300 atmospheres pressure with an ethylene-carbon monoxide mixture in the ratio of 45 to 55. The reaction product (344 parts) contains 24 per cent of propionic acid and 58 per cent of propionic acid propyl ester. This mixture may be separated by fractional distillation. The distillation residue contains practically the total of the catalyst. It may be used again for another batch.

We claim:

1. In the production of aliphatic carboxylic acids, their anhydrides and esters by the carbonylation of aliphatic olefin hydrocarbons in the presence of a compound selected from the group consisting of water, saturated unsubstituted aliphatic monoalcohols and the fatty acid to be produced under superatmospheric pressure and at elevated temperatures the step which comprises using as a catalyst only a catalytic amount of a complex salt derived from a metal selected from the group consisting of nickel and cobalt and a saturated aliphatic carboxylic acid containing from two to six carbon atoms and containing in addition to the carboxylic acid group at least one substituent selected from the group consisting of the hydroxy, keto and carboxylic acid groups.

2. A process as set forth in claim 1, wherein ethylene is used as the olefin.

3. In the production of propionic acid and its anhydride by the carbonylation of ethylene in the presence of aqueous propionic acid, the step which comprises using as a catalyst only a catalytic amount of a complex salt derived from a metal selected from the group consisting of nickel and cobalt and a saturated aliphatic carboxylic acid containing from two to six carbon atoms and containing in addition to the carboxylic acid group at least one substituent selected from the group consisting of the hydroxy, keto and carboxylic acid groups.

4. A process as set forth in claim 3, wherein the complex salt of a saturated aliphatic hydroxy carboxylic acid containing from two to six carbon atoms is used as the catalyst.

5. A process as set forth in claim 3, wherein the complex salt of a saturated aliphatic hydroxy dicarboxylic acid containing from two to six carbon atoms is used as the catalyst.

6. A process as set forth in claim 3, wherein the complex salt of a saturated aliphatic hydroxy dicarboxylic acid containing from two to six carbon atoms is used as the catalyst, the salt containing in addition to the metal selected from the group consisting of nickel and cobalt a cation selected from the group consisting of alkali metal, ammonium and short chain alkyl ammonium, pyrollidinium, piperidinium, pyridinium and pyrollium cations.

7. A process as set forth in claim 3, wherein a complex nickel salt of a saturated aliphatic hydroxy dicarboxylic acid containing from two to six carbon atoms is used which contains the pyridinium cation.

8. A process as set forth in claim 3, wherein a complex cobalt salt of a saturated aliphatic hydroxy dicarboxylic acid containing from two to six carbon atoms is used which contains the pyridinium cation.

9. A process as set forth in claim 3, wherein the complex salt of a saturated aliphatic keto carboxylic acid containing from two to six carbon atoms is used as the catalyst.

10. A process as set forth in claim 3, wherein the complex salt of propionyl propionic acid is used as the catalyst.

11. The process for the production of propionic acid and its anhydride which consists in treating ethylene at temperatures between 170° and 290° C. and under pressures between 150 and 800 atmospheres with carbon monoxide in an aqueous propionic acid solution containing as the catalyst a complex salt derived from a metal selected from the group consisting of nickel and cobalt and a saturated aliphatic carboxylic acid containing from two to six carbon atoms and containing in addition to the carboxylic acid group at least one substituent selected from the group consisting of the hydroxy, keto and carboxylic acid groups.

12. A process for the production of propionic acid and its esters which consists in treating ethylene at temperatures between 170° and 290° C. and under pressures between 150 and 800 atmospheres with carbon monoxide in a solution which contains in addition to an aqueous propionic acid a substantial amount of a lower molecular fully saturated unsubstituted aliphatic monoalcohol and as the catalyst only a catalytic amount of a complex salt derived from a metal selected from the group consisting of nickel and cobalt and a saturated aliphatic carboxylic acid containing from two to six carbon atoms and containing in addition to the carboxylic acid group at least one complex forming substituent selected from the group consisting of the hydroxy, keto and carboxylic acid groups.

13. A process as set forth in claim 12, wherein the alcohol contains between 1 and 4 carbon atoms.

References Cited in the file of this patent

UNITED STATES PATENTS

| | | |
|---|---|---|
| 2,542,767 | Gresham et al. | Feb. 20, 1951 |
| 2,604,490 | Reppe | July 22, 1952 |
| 2,658,075 | Reppe et al. | Nov. 3, 1953 |